Sept. 19, 1967   R. HILTSCHER ET AL   3,342,209
UNSYMMETRICAL CONNECTION-PIECE NOZZLE
Filed Aug. 17, 1964                 3 Sheets-Sheet 1

$\sigma_t = \sigma_o$
$\sigma_a = 0.5\sigma_o$
$\sigma_t = 2\sigma_a$

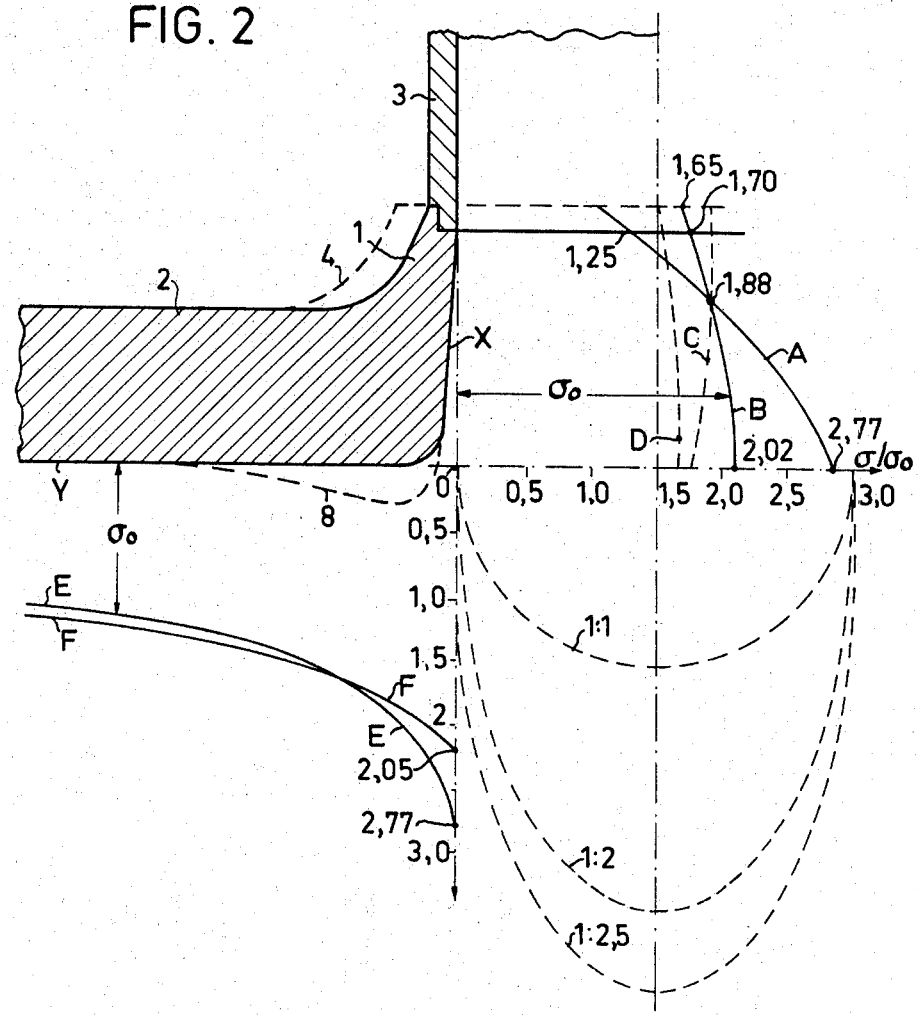

United States Patent Office 3,342,209
Patented Sept. 19, 1967

3,342,209
UNSYMMETRICAL CONNECTION-PIECE NOZZLE
Rudolf Hiltscher, Lovbrunna Gard, Taby, Sweden, and Gunnar Florin, Sollentuna, and Sture Söderberg, Stockholm, Sweden; said Florin and said Söderberg assignors to said Hiltscher
Filed Aug. 17, 1964, Ser. No. 390,133
Claims priorty, application Sweden, Aug. 21, 1963, 9,134/63
5 Claims. (Cl. 137—561)

This invention relates to an unsymmetrical connection-piece nozzle connected to a wall portion of a vessel subjected to internal pressure wherein the stresses in the shell, i.e. the stresses in the material in the plane or curved wall portion are not approximately equal in all directions. In other words the invention is not related with a nozzle of a spherical pressure vessel, but first of all to an unsymmetrical nozzle attached to or provided in the curved wall of a cylindrical vessel, e.g. the usually cylindrical wall of the pressure vessel surrounding a nuclear boiling reactor for generating the pressure steam from heavy water, or to nozzles of a conventional steam dome.

In this connection the term "unsymmetrical" nozzle means a one-sided nozzle which does not project from both of the two sides of the wall, but a nozzle which projects from one side only (normally from the outside) of the wall of the pressure vessel and possibly has a very slight projection or a low flange on the other side of the wall.

FIG. 1 is a diagrammatic view of part of a comparatively thin-walled cylindrical pressure vessel in which there is no great difference between the mechanical stresses occuring on the internal and external side of the wall. The term "stress" (dimension kp./cm.² or lbs. p.s.i.) means here always the specific mechanical force per unit of cross-sectional area. At any point P of the wall of the cylindrical vessel there occurs an axial (longitudinal) stress $\sigma_a$ and a tangential (peripheral) stress $\sigma_t$. As is well known a cylindrical pressure vessel satisfies the equations $$\sigma_t = pr/s$$
$$\sigma_a = \tfrac{1}{2} pr/s$$

where $r$ is the radius of the vessel, $s$ is the thickness of the wall of the vessel and $p$ is the pressure prevailing inside the vessel. To describe the stresses occurring in such a pressure vessel the stress $\sigma_t$ is taken as reference unit stress $\sigma_0$ (which is assumed to equal to 1) and all stresses are indicated as multiples thereof. Consequently $$\sigma_t = \sigma_0$$
$$\sigma_a = \tfrac{1}{2} \sigma_0$$

If the wall of this vessel has a circular through hole as shown midway of FIG. 1, the tensile stresses occurring at the edges of the hole (the edge stresses) can only be tangential to the edge as is always the case with all free edges. The stresses at the edge of the circular hole are non-uniformly but symmetrically distributed as shown in FIG. 1 and have different values between $0.5\sigma_0$ and $2.5\sigma_0$. To draw a comparison it may be mentioned that the tensile stresses around the edge of a circular hole in a spherical pressure vessel are uniformly distributed and at all points equal to $2.0\sigma_0$. In this connection it is, of course, assumed that the pressure prevailing in the vessel does not escape through the hole.

Since the stress in the material of a cylindrical wall of uniform thickness would be only $\sigma_t = \sigma_0$, each hole and consequently each nozzle must result in a considerable local increase of the stress which will be 2.5 times as high in certain parts of the edge of a circular hole as at certain distances therefrom. For this reason it is necessary either to use a considerably thicker plate for the entire vessel than otherwise necessary, or to reinforce the edge of the hole. The hole is usually reinforced by welding thereto a connecting flange or the like which often is needed anyway or by using a "symmetrical nozzle" which in its simplest form is obtained by securing a connection pipe such that this pipe extends some distance into the pressure vessel. This pipe has a reinforcing effect and results in a considerable reduction of the stress concentrations at the edge of the hole.

However, in many cases it is unsuitable or impossible to use a symmetrical nozzle or a corresponding reinforcing element disposed symmetrically with respect to the hole of the vessel. E.g. the portion of the nozzle projecting into the vessel might obstruct flow of gases of liquids (e.g. in a steam dome) or it might form dirt-collecting pockets or results in spots liable to corrosion. Another important example is a nuclear boiling reactor which contains extremely expensive heavy water (at present $55 per litre). Consequently the quantity of heavy water and the volume of the pressure vessel filled with water should be as small as possible, but is unnecessarily increased if symmetrical nozzles are used. Also in chemical autoclaves and in high pressure machines, such as high pressure compressors, it is often impossible, for constructional or other reasons, to use symmetrical nozzles. Similar problems are involved in submarines, the pressure hulls of which nowadays often must be able to withstand extremely high pressures of thousands of p.s.i. and in which the nozzle usually must not project outside the pressure hull. In spite of the reversed pressure conditions there are certain important similars in the framing of the problems.

All such unsymmetrical reinforcements of the hole have a very little effect only. If the nozzle or the reinforcing flange are disposed on the outside of the vessel the reinforcing effect cannot so to say, quite extend to the inside. Consequently the two points where the stresses according to FIG. 1 would have their maximum value $2.5\sigma_0$ in the case of a non-reinforced hole, will not be relieved but the stress will actually assume still higher values because of the fact that the unsymmetrical reinforcement on the outside results in an inward deflection of the hole of the vessel, owing to the effect of the pressure. In this case the stress concentration is likely to amount to $3.5\sigma_0$ and even more according to previously published papers. In case of thick-walled containers where the stresses in the internal side are higher than the stresses in the external side, as is well known from gun barrels and the like, there is the additional disadvantage that the edge-reinforcing effect of a one-sided nozzle or an external reinforcement will even less extend to the inside.

Such a high stress concentration results in that the hole of the pressure vessel has to be dimensioned for an internal pressure which is not less than 3.5 times as high as the actual pressure. Since official directions do not permit a calculation based on the actually prevailing pressure but on the prescribed test pressure, an unsymmetrical nozzle may be very disadvantageous, especially as regards economy of the construction.

In accordance with the invention it is possible to use an unsymmetrical nozzle in which the maximum relative stress occurring in the vicinity of the nozzle will be considerably lower than the above mentioned values. This advantage is especially apparent constructively and economically in case of thick-walled vessels for high internal pressures but in principle also may be obtained for thin-walled vessels although in the latter case the strength of the vessel often can be oversized without too serious constructional and economical consequences.

Near the lower end of FIG. 1 there is illustrated a hole which is not circular but elliptic with the minor axis of the ellipse being half of the major axis. In the course of the investigations on which the invention is based, this ratio 1:2 has been found suitable and is the theoretical optimal value under ideal conditions for an elliptic hole in a very thin-walled cylindrical pressure vessel. Near the edge of such a hole there occurs now here a tensile stress or edge stress higher than $1.5\sigma_0$ and the stress is constant along the entire edge of the hole.

In brief, the invention consists in that the unsymmetrical nozzle is shaped such that its orifice and the internal side of the vessel is elongated as described above and that the initially elongated cross-section eventually merges within the extent of the nozzle, and preferably also in the region of the hole of the vessel, into a circular cross-section for attachment to a pipe.

The effect of this nozzle construction can be simply explained as follows: On the internal side of the vessel where the reinforcing effect of the external nozzle is low or nonexistent, the orifice is oblong elongated and, consequently, no substantial stress concentration occurs. Outside the vessel where the nozzle projects and the cross-sectional profile is less oblong the nozzle acts reinforcing and reduces the otherwise occurring stress concentrations.

The hole needs by no means be an ellipse but may be of any other elongated form such as in the form of a lens (which, however, may result in a certain fractural impression and reduced impact resistance) or the hole may have two parallel substantially straight long sides and two substantially semi-circular short sides. The important thing is that the minor axis of the hole extends substantially in the axial direction of the vessel.

It may be mentioned that T-pieces are known consisting of a piece of pipe (substantially corresponding to the pressure vessel) and a lateral branch (substantially corresponding to the nozzles) said branch having an elongated nozzle the major axis of which—in contrast to the principle of this invention— is parallel to the axis of said piece of pipe for improving the flow conditions but without the possibility of reducing the stresses in the material which is the object of this invention. In case of oblique nozzles on cylindrical vessel and in case of Y-pieces the oblique position results in an elliptic joint. Irrespective of the position of the ellipse and even if the major axis of the ellipse stands at right angles to the axis of the pressure vessel, a different and less advantageous distribution of the stresses is obtained in these cases as compared with the invention. Besides, a nozzle according to the invention is preferably devised such that its axis intersects the axis of the pressure vessel or passes comparatively close thereto and preferably is perpendicular to the axis of the pressure vessel so as to extend radially therefrom.

An example of a nozzle according to the invention and certain modifications thereof are described hereinbelow with reference to the annexed drawings.

FIG. 1 which already has been explained is a diagrammatic view of the stress conditions in the shell of a cylindrical pressure vessel having a circular and an elliptic hole.

FIG. 2 is a fragmentary sectional view of one half of the wall of a vessel having a nozzle according to the invention viewed at right angles to the axis of the vessel.

Figure 3:
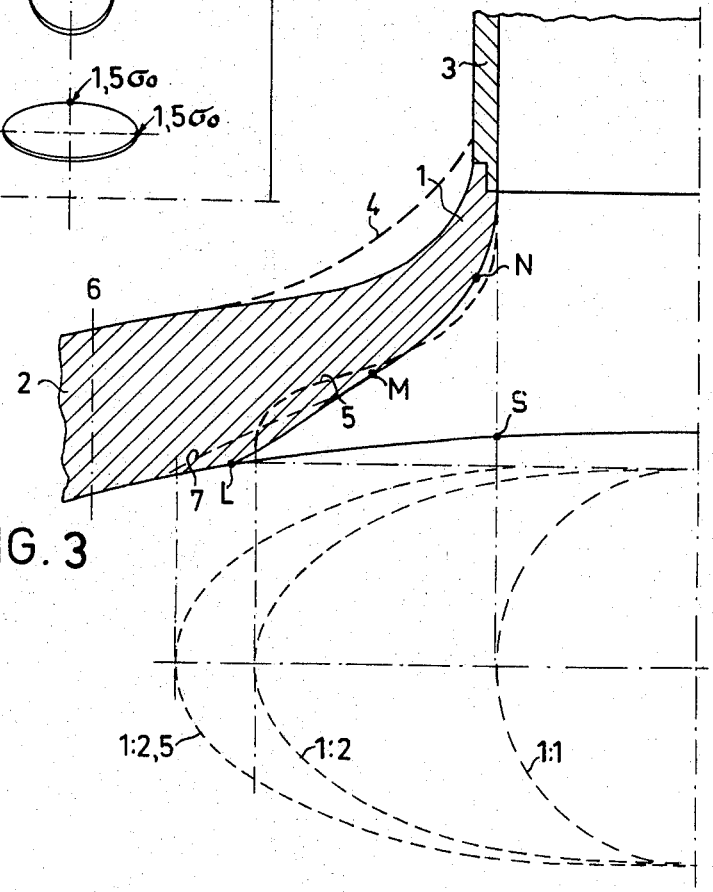
FIG. 3 is a corresponding section viewed in the direction of the axis of the vessel.

FIGS. 2 and 3 illustrate a seamless nozzle 1 stamped out of the wall 2 of a cylindrical vessel. The lower or internal orifice of the nozzle 1 in FIGS. 2 and 3, i.e. the aperture at the internal side of the hole of the vessel 2, is substantially elliptic which involves that the projection of the three-dimensional curve of the orifice is an ellipse.

The excentricity or ratio of the minor to the major axis of the ellipse is 1:2. The major axis of the ellipse extends circumferentially of the pressure vessel and is horizontal and is slightly curved as viewed in FIG. 3 but is perpendicular to the plane of the drawing as viewed in FIG. 2. The minor axis of the ellipse is parallel to the longitudinal axis of the cylindrical pressure vessel. The dotted semi-ellipses denoted by the excentricity numbers 1:2 in FIGS. 2 and 3 illustrate the shape, position and extension of the orifice.

The upper or external orifice of the nozzle 1 for attachment to a pipe 3 is circular as indicated by the dotted circle 1:1. A clear idea of the shape of the entire nozzle can be formed from FIGS. 2 and 3. The cross-sectional area of the nozzle is everywhere an ellipse the eccentricity of which is 1:2 at the inner or lower orifice and eventually changes in the outward direction until it equals 1:1 which means that the ellipse becomes a circle at or somewhere below the upper orifice. The external side of the nozzle is correspondingly formed such that the wall thickness is fully satisfactory at all places and such that the distribution of the stresses is fairly uniform.

FIG. 2 illustrates the distribution of the stresses on the inner surfaces of the nozzle and the wall of the pressure vessel. The curves B and F apply to the above described nozzle. The curve B illustrates the relative stress $\sigma/\sigma_0$ at different points on the internal side of the nozzle 1 along the line X parallel to the axis of the nozzle in the plane of the drawing. The horizontal coordinate scale $\sigma/\sigma_0$ in FIG. 2 is for the curves A–D whereas the vertical coordinate scale which is entirely independent of the first-mentioned scale relates to the curves E and F.

Figure 1:
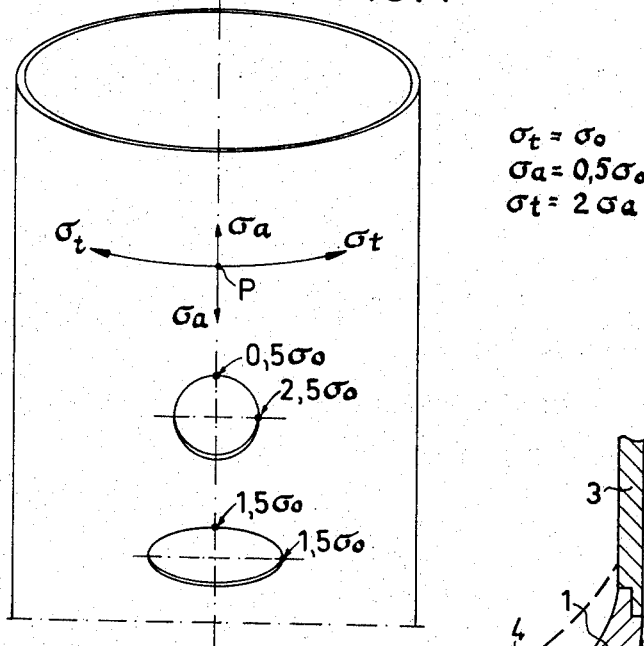

From curve B it will be seen that in the plane of section illustrated the maximum stress occurs at the edge of the inner orifice and is equal to 2.02, whereas the stress at the edge of the upper orifice is equal to 1.65. If the pressure vessel 2 had no nozzle or hole the relative stress would be $\sigma/\sigma_0=1$. Therefore it will be seen that the nozzle illustrated in FIGS. 2 and 3 and formed in accordance with the invention does not correspond to the theoretical ideal case. As explained above with reference to FIG. 1, the maximum relative stress occuring at the edge of a circular hole is at least equal to 2.5. In case of an elliptic hole with the excentricity 1:2 the maximum stress is equal to 1.5. The nozzle illustrated having a maximum stress value of about 2.0 is about midways between the two theoretical cases. The difference as compared with the elliptic hole in FIG. 1 is due to the fact that the wall thickness of the pressure vessel 2 illustrated in FIGS. 2 and 3 is by no means negligible.

If the nozzle according to FIG. 2 would be defined by a surface of rotation and, consequently, would be throughout of circular cross-section in which case FIG. 3 would not be relevant, curve A would apply instead of curve B. In that case the maximum edge stress would be 2.77 and consequently considerably higher than the theoretical value 2.5 for a circular hole, which also is due to the non-negligible wall-thickness. Besides, the distribution of the stresses would be considerably non-uniform, and the stresses along the edge of the hole would vary between about 1.25 and 2.77, whereas the stresses according to curve B vary between 1.65 and 2.02 only. This by itself indicates a considerably improved construction in view of the fact that in the ideal case the stresses should remain constant along the whole edge, of the orifice. In view of the fact that a pipe welded to the outer edge of the nozzle results in a certain reduction of the strength at the welded joint, a distribution of the stresses in accordance with curve B is nevertheless desirable in practice.

Curve F is related with the nozzle illustrated to which curve B applies. Curve F illustrates the variation of the stress along the internal side of the hole 2 of the pressure vessel axially of the vessel or, in other words, along the inside of contour Y as represented by the vertical scales $\sigma/\sigma_0$. (To be fully correct this scale and the appertaining curve E and F should be displaced a few millimetres to the left in FIG. 2, but this would be at the expense of the surveyability of the other relations.) At both ends of the minor axis of the ellipse at the edge of the elliptic orifice the stress is a maximum and amounts to about 2.05. The fact that this value does not fully correspond to the value 2.02 according to curve B is due to the rounded shape of the edge of the orifice which is clearly seen in FIG. 2. In the direction away from the orifice along the line Y the stress decreases rapidly and approaches asymptotically the value 1.0 applying to a pressure vessel hole free of interference.

Curve E applies to the above named case of a circular edge of the lower orifice and belongs to curve A. The maximum stress is 2.77 and the curve E approaches the value 1.0 along the line Y more rapidly than the curve F. Consequently the distribution of the stress is more non-uniform even in this direction in case of a circular inner orifice than in case of an elliptic orifice.

For the sake of comparison the stresses in the sectional plane according to FIG. 3 may also be considered. These stresses are throughout lower than the maximum stresses according to FIG. 2 and therefore need not be discussed in detail. Point M is located midway of the wall-thickness of the pressure vessel 2 and the point N is located in line with the external periphery of the wall, or in other words, the imaginary extension of the central line and the external surface of the wall intersect the internal surface of the nozzle at the points M and N, respectively, whereas point L is located in line with the internal surface of the wall. The stress $\sigma/\sigma_0$ is 0.72 at the point L, 0.92 at the point M and 0.66 at the point N. Thus it will be seen that the maximum stress occurs somewhere about the central portion of the wall 2 near the internal side of the nozzle. If the nozzle were a true circular cylinder, see the circle 1:1 in FIG. 3, the stress at the point S would be about 0.6 and consequently in fact lower than in case of the nozzle according to the invention. However, this is of no significance because the stresses occuring in the section according to FIG. 2 are considerably higher in both cases and therefore decisive of the dimensions of the nozzle. The curves shown by full lines, A, B, E, and F are plotted with the guidance of test readings whereas the dotted curves to be explained below have been obtained by extrapolation and calculation.

Curve C in FIG. 2 is applicable if the inner orifice of the nozzle is elliptic and the excentricity of the ellipse is equal to 1:2.5 in accordance with the dotted contour 7 in FIG. 3 and the dotted ellipse 1:2.5 in FIGS. 2 and 3. It should be mentioned here that the curves A, B and C intersect each other at a common point $\sigma/\sigma_0=1.88$ and are turned about this point according as the excentricity of the ellipse changes from 1:1 (circular) to 1:2 and 1:2.5. As to the ellipse 1:2.5 the maximum stress at the edge of the elliptic orifice is about 1.7 but is almost 2.0 at the edge of the outer, circular orifice. With the illustrated shapes and dimension of the pipe 3 and the nozzle the optimum excentricity or slenderness ratio of the ellipse is consequently believed to about 1:2.3.

However, it is quite obvious that it is not possible without additional measures materially to reduce the maximum stress to a value lower than the value 1.88 at the intersection of the curves. One of a plurality of possible measures is indicated at 4 in FIGS. 2 and 3. If the wall-thickness of the upper portion of the nozzle is increased such as indicated, for example, by the dotted external line 4, the distribution of the stresses will be approximately as indicated by the curve D. In this case it is believed that the stress nowhere will exceed the value 1.65 and can be reduced still more by additional reinforcement. However, with the thick wall 2 of the pressure vessel illustrated, very strong and extensive external reinforcements would be required to obtain a stress maximum lower than perhaps 1.5, but even the shape and dimensions of the illustrated end portion of the pipe 3 are not of negligible account. However, an evident improvement is obtainable by the permission of a bead 8 or the like on the internal side of the pressure vessel as shown in FIG. 2. In such case the nozzle may still be considered an unsymmetrical nozzle according to the invention in spite of the fact that it has a small projection extending from the internal surface of the wall. Said bead, or the like, can be easily formed by pressing or by upsetting.

The fact that the maximum stress in a nozzle having an elliptic orifice may be reduced to less than 1.5 in spite of the optimum case according to FIG. 1 is due to the "open," non-reinforced hole in FIG. 1. Even in FIG. 1 the values would be different, and usually lower, if the edge of the hole would be reinforced either directly or by securing a thick-walled elliptic pipe in the hole.

From the above it will also be seen that the slenderness ratio of the elongated orifice, i.e. the ratio between the maximum dimensions peripherically and axially of the pressure vessel, need not be especially great and and that the optimum slenderness ratio with regard to the maximum stress in most nozzles for practical use can be assumed to be between 2 and 2.5. This problem will be discussed later on with reference to FIG. 4.

According to FIGS. 2 and 3 the hollow or flow passage of the nozzle between the elongated and the circular orifice is substantially in the form of a truncated cone having an elliptic base and a circular top, wherein the minor axis of the ellipse is equal, or eventually equal, to the diameter of the circle. According to the line X, the generatrix of the cone is straight or substantially straight along the narrowest part of the cone, see FIG. 2, and is inwardly curved toward the axis of the cone along the widest part of the cone, see line L–M–N in FIG. 3. In itself the generatrix may be straight in all directions except for its ends which should be rounded to avoid sharp edges around the orifices. Alternatively, the generatrix at least as viewed in FIG. 3 may have an inflexion as indicated at 5 in FIG. 3. Further, in all nozzles devised in accordance with the invention the shortest inner dimension of the elongated orifice may be another, above all greater than the inner diameter of the outer or upper circular orifice, see for example FIG. 3, such that the area of the passage between the pipe 3 and the internal surface of the pressure vessel 2 increases even in that direction to obtain improved flow characteristics etc.

As shown in FIG. 3 the oblong end portion of the nozzle may be concave at 5 which sometimes may result even in advantages in fabrication.

The maximum stresses can be further reduced in a nozzle in which the above named cone enclosed by the nozzle and having an elliptic internal end and a circular outer end, is longer and consequntly steeper than in the embodiment according to FIG. 2. Thereby, the effect of the thickness of the wall of the vessel is reduced. In case of a too low cone this effect results in that the slenderness ratio or excentricity of the flow passage, which at the internal orifice is between 2.0 and 2.5 rapidly decreases along the wall of the passage through the wall of the vessel, i.e., substantially unity and, thus, is almost non-existent and non-effective as regards stresses at that place where the passage passes the level of the external surface of the wall of the vessel and continues outwards into the part of the nozzle located outside the vessel.

A nozzle 1 such as shown in FIGS. 2 and 3 need not be integral with the wall of the pressure vessel but may be a separate nozzle which is secured e.g. by welding in an appropriate and preferably circular opening in the cylindrical wall 2 of the pressure vessel. E.g. the entire portion located to the right of the dotted line 6 in FIG. 3 may consist of an individually fabricated nozzle in which case the line 6 is the generatrix both of a, say, circular or rectangular hole in the wall 2 of the vessel and of the circular or rectangular (respectively) circumference of the nozzle to be secured to the wall. The radius of the circular circumference of the nozzle is equal to the distance between the line 6 and the parallel axis of the nozzle indicated to the right in FIG. 3. For the sake of clearness the corresponding line 6 is not shown in FIG. 2. If the hole, and consequently the joint 6, is circular this joint should be located at such a distance from the internal end of the orifice (L in FIG. 3 and approximately X in FIG. 2) that the stress concentration around the hole in the pressure vessel according to the terms E, F in FIG. 2 does not, or to a small degree only, extend to the joint. Otherwise, the strength of the joint must be substantially the same as if the joint were not existent. i.e. as if the nozzle 1 at the wall 2 of the pressure vessel were fabricated in one piece.

Alternatively the hole and consequently the joint may be elongated and preferably elliptic in the peripheral direction of the pressure vessel in accordance with the inventive idea regarding elongated holes or orifices whereas the fluid passage in the nozzle may have any suitable cross-sectional area e.g. circular throughout the length of the nozzle. In this case a nozzle element inserted in the hole may be provided with a supporting flange which engages the inner surface of the wall 2 and is biased toward said wall by the internal pressure in the vessel. The external and internal shape of the nozzle proper is of no importance for the invention. The external contour may, but need not be ellipitic near the flange portion of the nozzle element and circular at the outer orifice. The flange should be slightly movable in the axial direction of the vessel or resilient relative to the vessel, or the nozzle should itself be slightly elastic in this direction. It need not be described how a seal may be effected between the nozzle and the pressure vessel.

According to FIG. 3 the diameter of the circular upper orifice of the nozzle is considerably smaller than the diameter of the pressure vessel in the region of the nozzle. Thus, it is immaterial whether the major axis of the ellipse illustrated is considered to extent along the internal profile of the pressure vessel or along the chord. In cases where this assumption is not applicable, conditions are different. The developed view of the intersectional line between two intersecting cylinders is always an ellipse. Even the projection of the intersectional line may be an ellipse if the axes of the cylinders do not intersect each other or do not intersect at right angles.

The portion of the nozzle extending outside the external surface of the pressure vessel should be welded around its circumference to the wall of the vessel or should preferably be integral with a portion which is inserted into or forms part of the wall 2 of the pressure vessel. If the portion of a nozzle according to the invention projecting outside the wall of the pressure vessel is only screwed or otherwise regularly connected to the wall of the vessel such construction must be considered unsuitable in most cases although it is sometimes unavoidable for constructional, manufacturing and economical reasons.

Within the scope of the invention the arrangement may be such that a straight elongated through-hole is made in the wall of the pressure vessel, e.g. in the form of an ellipse of a flat oval defined by two parallel sides which without discontinuity are completed by two semi-circles or semi-ellipses, and that a piece of pipe or the end portion of a pipe to be connected to the nozzle is correspondingly flattened and secured, preferably by welding, in the conforming hole. In this case the major part of the nozzle or the entire nozzle is not formed from (not integral with) the wall 2 of the pressure vessel but is connected to the wall 2 only after said pipe has been secured to the nozzle.

As mentioned above the wall-thickness of the projecting portion of the nozzle may be one and the same everywhere in the region between oblong and circular cross-section of the flow passage and may further be equal to the wall-thickness of the pressure vessel, especially if at least in said regions the nozzle is integral with the wall of the pressure vessel. This latter design in combination with a vessel wall and nozzle wall of uniform thickness also results in practical advantages in relatively thin-walled pressure vessels, such as steam boilers, hydrophores, compressed air tanks for compressors for driving pneumatic tools or the like, pressurized liquid containers for hydraulic purposes, such as hydraulic hoisting gears, etc.

Finally it should be noted that manufacturing of a nozzle according to the invention by pressing, and especially by stamping out of the wall of the pressure vessel, results in certain apparent advantages as compared with the corresponding conventional manufacture of circular nozzles. For example, it will be evident from FIGS. 2 and 3 from a consideration of the shape of the nozzle that the flow of material during the pressing or stamping operation is facilitated and that the regions of abrupt transitions, if any, such as at FIG. 2, are considerably smaller as compared with conventional circular nozzles. It is true that the pressure tool required is more expensive as compared with pressure tools for circular nozzles, but in case of series production or fabrication of highly valuable products, such as nuclear reactor vessels, large high pressure vessels or the like this disadvantage is of little significance or even negligible as compared with the advantages.

Figure 4:
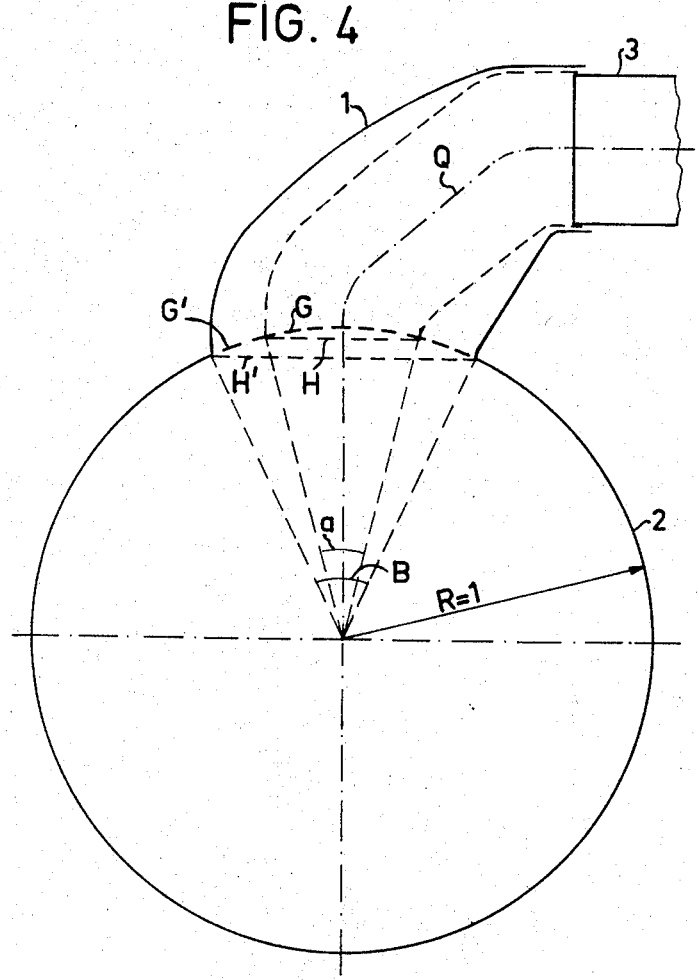
FIG. 4 is a geometrical diagraph for the explanation of certain mathematical relations in a nozzle.

FIG. 4 is a diagrammatical view of a cylindrical pressure vessel 2 provided with a nozzle devised in accordance with the invention and having inserted therein a circular connection pipe 3 and also provided with a conventional circular-cylindrical nozzle fitting the pipe 3 and indicated by dotted lines. The projection on the wall of the pressure vessel of the circular orifice of the conventional nozzle with the axis Q of the nozzle taken as axis of projection is a circle with a diameter H (equal to the length of the chord in FIG. 4). In a developed state this circle becomes an ellipse, the minor axis of which is equal to H (which previously also was straight) and the major axis of which is equal to the length of G (which prior to the development was curved) extending through an angle $\alpha$ of the arc. Consequently, the length of the arc G equals the length of the major axis, and the orifice of a conventional circular-cylindrical nozzle is not truely circular but slightly elliptic in a developed state. Such a circular nozzle may also be inclined to the pressure vessel (not radial) so that the orifice of the nozzle will be elliptic for this reason as already mentioned above.

However, as compared with these constructions the orifice of a nozzle according to the invention is more elongated, so that $\beta$ is greater than $\alpha$, and H' is greater than H. In this case the developed view of the ellipse (or another elongated area) has a major axis equal to G' and a minor axis equal to or longer than H. Further above a nozzle according to the invention has been described wherein the nozzle element itself may be of almost any desired shape but is inserted in an elliptic hole in the wall of the pressure vessel. The above or following considerations regarding the elongated orifice of a nozzle according to the invention apply to the elliptic hole for such a nozzle.

In case of a conventional circular nozzle the projection of the orifice on the plane of the chord is always a circle, whereas in case of a nozzle according to the invention the projection of the orifice on the plane of the chord H' is an ellipse or another figure which is elongated in the peripheral direction of the vesel. The following mathematic relations and numerical values will more clearly explain the difference. With the angle $\alpha$ in terms of radians, the length of the arc G is equal to $R\alpha$, wherein R is the radius of the cylindrical vessel. The length of the chord follows from $H = 2R \sin \frac{1}{2} \alpha$. Consequently the excentricity of the elliptic developed orifice is $G/H = \frac{1}{2} \delta \sin \frac{1}{2} \alpha$. It should be borne in mind that these equations apply to the three-dimensional ellipse on the periphery of the wall 2 and not to an ellipse projected on the plane of the chord H. Numerical values are indicated in the following table.

| α (degree) | α (rad) | G/H |
|---|---|---|
| 0 | 0 | 1.00 |
| 28.65 | 0.5 | 1.011 |
| 45.84 | 0.8 | 1.027 |
| 57.30 | 1.0 | 1.043 |
| 83.94 | 1.5 | 1.099 |
| 90 | π/2 | 1.110 |
| 114.6 | 2.0 | 1.188 |
| 143.24 | 2.5 | 1.317 |
| 171.89 | 3.0 | 1.504 |
| 180 | π | 1.57 |

From the above it follows that the developed view of the (peripheral) ellipse which according to the third column of the table is obtained if a hole assumed to be circular in the plane of the chord H is made in the wall 2 for a conventional nozzle has a negligible excentricity (smaller than 1.110) if the apex angle α does not exceed 90°, i.e. if the orifice of the nozzle does not cover more than one fourth of the circumference of the wall 2. Only if the nozzle covers the greatest possible extent, i.e. one-half of the circumference, the excentricity of the ellipse would be 1.57. In practice such a conventional nozzle could scarcely cover more than 170° in view of its oblong orifice in developed state and the excentricity would be almost exactly 1.5. This case is conceivable in T-pieces but is not comprised by the invention although the invention is not limited to nozzles in which the difference between the arc G' and the chord H' is negligible, i.e., in which the length of the oblong orifice would be very small as compared with the diameter of curvature of the wall 2. As a matter of fact, in the theoretical ideal case according to FIG. 1, the most favourable distribution of the stresses is obtained with an excentricity of 1:2 of an ellipse.

An important feature of the invention consists in that the values G' and H' noticeably exceed G and H, respectively, or that β noticeably exceeds α or that the slenderness ratio of the oblong orifice noticeably exceeds the corresponding excentricity G/H of the projected ellipse according to the above table.

However, the invention does not comprise nozzles having an opening angle β (FIG. 4) of more than about 135° and preferably comprises nozzles having an opening angle β smaller than about 90° or 100°. It should be noted that the angle α which represents the minor axis of the orifice and consequently in practice represents the diameter of the circular outer orifice of the nozzle, is correspondingly smaller. The slenderness ratio (ratio between the two dimensions in the peripheral and axial direction of the pressure vessel) of the oblong inner orifice should exceed the slenderness ratio of said ellipse by at least 10%, especially at least 20%, and preferably at least 33%. Further said slenderness ratio should be at least 1.2 and preferably at least 1.5. Depending on the wall-thickness and other practical conditions the most favourable range of the slenderness ratio probably is usually between about 2 and 2.5. Nevertheless, values down to 1.8 and up to 2.8 and in certain cases values up to 4 and (as mentioned above) down to 1.5 and sometimes even down to 1.2 may be applicable.

It should be mentioned that the above considerations regarding the slenderness ratio of the elongated orifice of a nozzle according to the invention hold true even if the length of the orifice in the axial direction of the pressure vesesl is greater than the length of H according to FIG. 4, i.e. if the nozzle enlarges inwardly toward the pressure vessel even in the axial direction of the vessel. Even in such a case the slenderness ratio of the orifice has to fulfill the above stipulated conditions such that on a given slenderness ratio the length of the orifice in the peripheral direction will be greater than in the case of an orifice the axial length of which is only equal to H.

It will be obvious without detailed explanation that a slenderness ratio as low as 1.2 or 1.3 or even 1.5 is unsuitable for the elongated orifice of a nozzle to be connected to a pipe 3 of an internal diameter of, say 6 to 10 millimetres (¼ to ½") in connection with a pressure vessel having a diameter of 2 metres or more. On the other hand a value as high as 4 or even 3.5 should not or cannot be chosen if a pipe of comparatively great diameter (e.g. 400 to 500 mm., that is about 16–20") is to be connected to such a vessel. In extreme cases it might even be quite unreasonable to choose so high a slenderness ratio because in that case the ends of the elongated orifice might be located near each other or even overlap each other on a point of the internal surface of the pressure vessel substantially diametrically opposite the nozzle. In that case the wall of the pressure vessel would be weakened along an angular area around the entire or almost entire periphery of the vessel.

What is claimed is:
1. A nozzle for atatchment of a pipe or the like to a cylindricall wall of a thick-walled pressure vessel, wherein the nozzle is integral with at least a part of said cylindrical wall and the nozzle orifice located adjacent the internal cylindrical surface of the wall of the pressure vessel is oblong, characterized in that the inner and outer surfaces of the nozzles are co-planar with inner and outer surfaces of that part of the wall of the pressure vessel to which the nozzle is contiguous, in that the cross-sectional area of the flow passage of the nozzle is circular at that end which is remote from the pressure vessel and is elongated in the peripheral direction of the wall at the nozzle orifice on the inner side of the wall of the pressure vessel, said latter orifice being curved in accordance with the curvature of the inner side of said wall and registering with said inner side and extending across not more than 100° of the periphery of the pressure vessel, the slenderness ratio of the elongated area of said orifice being at least 1.2 and not greater than 2.5 and the slenderness ratio of the flow passage of said nozzle extending from said elongated area to said circular area continuously and smoothly decreases to unity so that said flow passage has approximately the form of a truncated cone having an elongated base and a circular top and a continuous generatrix.

2. The nozzle defined in claim 1, in which the cross-sectional area of the orifice is elliptical and in which the axis of the nozzle extends substantially radially and at a right angle to the axis of the pressure vessel.

3. The nozzle defined in claim 2, in which at least half of the non-circular passage of the nozzle is located in the region of the wall of the pressure vessel.

4. The nozzle defined in claim 3, in which the shape of the nozzle is such that its peripheral external and internal surfaces continuously merge into the corresponding external and internal surfaces of the wall of the pressure vessel.

5. The nozzle defined in claim 3, the orifice of which slightly projects inwardly beyond the inside of the wall of the pressure vessel, the height of this projection being equal to a fraction only of the thickness of said wall and the projection merging continuously into the inner surface of the wall of the pressure vessel and into the inner surface of the flow passage of said nozzle.

References Cited

UNITED STATES PATENTS 2,773,720  12/1956  Palm et al. _____ 239—599

M. CARY NELSON, *Primary Examiner.*

E. W. KIRBY, *Examiner.*

W. R. CLINE, *Assistant Examiner.*

UNITED STATES PATENT OFFICE
CERTIFICATE OF CORRECTION

Patent No. 3,342,209                                      September 19, 1967

Rudolf Hiltscher et al.

It is hereby certified that error appears in the above numbered patent requiring correction and that the said Letters Patent should read as corrected below.

Column 10, line 44, after "that" insert -- a part of the non-circular part of said flow passage is located in the region of greatest thickness of said wall and --.

Signed and sealed this 24th day of September 1968.

(SEAL)
Attest:

Edward M. Fletcher, Jr.                                  EDWARD J. BRENNER

Attesting Officer                                             Commissioner of Patents